(12) United States Patent
Beroth (10) Patent No.: US 7,360,742 B2
(45) Date of Patent: Apr. 22, 2008

(54) AIRCRAFT PASSENGER ACCOMMODATION UNIT WITH DEPLOYABLE BED

(75) Inventor: Michael T. Beroth, Winston-Salem, NC (US)

(73) Assignee: B E Aerospace, Inc., Wellington, FL (US)

( * ) Notice: Subject to any disclaimer, the term of this patent is extended or adjusted under 35 U.S.C. 154(b) by 0 days.

(21) Appl. No.: 11/684,443

(22) Filed: Mar. 9, 2007

(65) Prior Publication Data
US 2007/0145187 A1 Jun. 28, 2007

Related U.S. Application Data

(63) Continuation of application No. 10/971,198, filed on Oct. 22, 2004, now Pat. No. 7,188,806.

(51) Int. Cl.
B64D 11/06 (2006.01)

(52) U.S. Cl. .................................................. 244/118.5

(58) Field of Classification Search ............ 244/118.5, 244/118.6; D6/334–336; 105/314–317, 105/319; 297/63
See application file for complete search history.

(56) References Cited

U.S. PATENT DOCUMENTS

| | | | |
|---|---|---|---|
| 1,048,131 A * | 12/1912 | Brackett .................... | 105/315 |
| 1,589,439 A * | 6/1926 | Snyder et al. ............. | 74/30 |
| 2,092,655 A | 9/1937 | Page, Jr. | |
| 2,332,841 A | 10/1943 | Burton et al. | |
| 2,346,878 A * | 4/1944 | Tully et al. ............... | 105/319 |
| 2,382,402 A | 8/1945 | Roode | |
| 2,414,730 A | 1/1947 | Flogaus | |
| D154,773 S | 8/1949 | Haman et al. | |
| 2,544,980 A * | 3/1951 | Brown ....................... | 297/67 |
| 2,599,606 A | 6/1952 | Burgess | |
| 2,600,706 A | 6/1952 | Tully et al. | |
| 2,608,366 A | 8/1952 | Jergenson | |
| 2,632,408 A | 3/1953 | Giles | |
| 2,844,109 A | 7/1958 | Austgen et al. | |
| 2,884,873 A | 5/1959 | Candlin, Jr. | |
| 2,914,001 A | 11/1959 | Murphy | |
| 2,947,349 A | 8/1960 | Kryter | |
| 2,953,103 A * | 9/1960 | Bohannon et al. ......... | 105/315 |
| 2,977,898 A | 4/1961 | Candlin, Jr. | |
| 3,290,079 A | 12/1966 | McKenzie | |
| 3,334,441 A | 8/1967 | Landis et al. | |
| 3,394,964 A | 7/1968 | Humphries et al. | |
| 3,784,989 A | 1/1974 | Legrand | |

(Continued)

FOREIGN PATENT DOCUMENTS

EP 1 099 627 A1 5/2001

(Continued)

Primary Examiner—Tien Dinh
(74) Attorney, Agent, or Firm—Adams Intellectual Property Law, P.A.

(57) ABSTRACT

A passenger accommodation unit with a deployable bed includes a passenger seat and a passenger bed positioned relative to the seat and adapted for movement between a stowed position in which the bed is upright and adjacent to the seat, and a deployed position in which the bed is horizontal for use and overlaps and is supported in part by the seat. The unit can include a credenza positioned adjacent the seat and between the seat and the bed that supports the bed when deployed.

18 Claims, 8 Drawing Sheets

U.S. PATENT DOCUMENTS

| | | | |
|---|---|---|---|
| 3,811,138 A | 5/1974 | Del Missier | |
| 4,085,962 A | 4/1978 | Wahls | |
| 4,115,884 A | 9/1978 | Keogh | |
| 4,138,949 A | 2/1979 | Gutridge et al. | |
| 4,458,864 A | 7/1984 | Colombo et al. | |
| 4,686,908 A | 8/1987 | Legrand | |
| 4,715,654 A | 12/1987 | Laskowitz | |
| 4,735,456 A | 4/1988 | Haefelfinger | |
| 5,024,398 A | 6/1991 | Riedinger et al. | |
| 5,259,575 A | 11/1993 | Cabrera | |
| 5,383,629 A | 1/1995 | Morgan | |
| 5,425,516 A | 6/1995 | Daines | |
| 5,487,240 A | 1/1996 | Miller | |
| 5,615,848 A | 4/1997 | Ceriani | |
| 5,651,219 A | 7/1997 | Baloga et al. | |
| 5,687,513 A | 11/1997 | Baloga et al. | |
| 5,716,026 A | 2/1998 | Pascasio et al. | |
| 5,740,989 A | 4/1998 | Daines | |
| 5,954,401 A | 9/1999 | Koch et al. | |
| 5,992,798 A | 11/1999 | Ferry | |
| 6,000,659 A | 12/1999 | Brauer | |
| D421,948 S | 3/2000 | Dryburgh et al. | |
| 6,059,364 A | 5/2000 | Dryburgh et al. | |
| D439,063 S | 3/2001 | Round et al. | |
| 6,209,956 B1 * | 4/2001 | Dryburgh et al. | 297/245 |
| 6,227,489 B1 | 5/2001 | Kitamoto et al. | |
| 6,273,366 B1 | 8/2001 | Sprenger et al. | |
| 6,585,188 B2 | 7/2003 | Alli | |
| 6,616,098 B2 | 9/2003 | Mills | |
| 6,691,952 B2 | 2/2004 | Keogh | |
| 6,692,069 B2 | 2/2004 | Beroth et al. | |
| 6,851,134 B2 | 2/2005 | Freller | |
| 2001/0003962 A1 | 6/2001 | Park et al. | |
| 2001/0015566 A1 | 8/2001 | Park et al. | |
| 2002/0033432 A1 | 3/2002 | Mikosza | |
| 2002/0070314 A1 | 6/2002 | Schmidt-Schaeffer | |
| 2003/0005639 A1 | 1/2003 | Kowalczyk | |
| 2003/0029967 A1 | 2/2003 | Mills | |
| 2003/0218095 A1 | 11/2003 | Saint-Jalmes | |
| 2004/0051003 A1 | 3/2004 | Cheung | |
| 2004/0080201 A1 | 4/2004 | Verney et al. | |
| 2004/0195451 A1 | 10/2004 | Bently et al. | |
| 2004/0232283 A1 | 11/2004 | Ferry et al. | |
| 2004/0251384 A1 | 12/2004 | Sprenger | |
| 2005/0001097 A1 | 1/2005 | Saint-Jalmes | |
| 2005/0001098 A1 | 1/2005 | Saint-Jalmes | |
| 2005/0023413 A1 | 2/2005 | Saint-Jalmes | |
| 2005/0040288 A1 | 2/2005 | Keogh | |
| 2005/0082430 A1 | 4/2005 | Young et al. | |
| 2005/0087650 A1 * | 4/2005 | Quan et al. | 244/118.6 |
| 2005/0103935 A1 | 5/2005 | Sprenger et al. | |
| 2005/0178906 A1 | 8/2005 | Brauer et al. | |
| 2005/0189451 A1 | 9/2005 | Mercier | |
| 2005/0211837 A1 | 9/2005 | Saint-Jalmes et al. | |
| 2006/0000947 A1 | 1/2006 | Jacob | |

FOREIGN PATENT DOCUMENTS

| | | |
|---|---|---|
| EP | 1 162 138 A2 | 12/2001 |
| EP | 1 121 291 B1 | 1/2005 |
| FR | 647809 | 12/1928 |
| JP | 5-13838 | 2/1993 |
| WO | WO 02/28712 A1 | 4/2002 |
| WO | WO 0228712 A1 | 4/2002 |

* cited by examiner

FIG. 8

AIRCRAFT PASSENGER ACCOMMODATION UNIT WITH DEPLOYABLE BED

TECHNICAL FIELD AND BACKGROUND OF THE INVENTION

This application is a continuation of U.S. application Ser. No. 10/971,198, filed Oct. 22, 2004. The invention relates to an aircraft accommodation unit with a deployable bed. The invention has particular application in first class cabins of long-haul passenger aircraft, but has utility in any form of transportation where both seating and seating facilities would be necessary or desirable. Thus, while the invention is disclosed for the purpose of illustration with reference to aircraft seating, the invention is not so limited.

Long-haul aircraft flights regularly fly non-stop to destinations 12-18 hours or more away from the origination point. At present, first class cabins provide various forms of "sleeper seats", meaning that the seat back reclines to the point where the seat occupant is able to attain a prone or nearly-prone position. In some cases the seats form a horizontal sleeping surface, and in other cases the head end of the reclined seat is raised to some degree above the foot end. However, there are deficiencies in this arrangement, including the fact that the seat cushions are typically firmer than would be ideal for a sleeping mattress, and the fact that the seat bottoms and seat backs that make up the "bed" in the reclined position are not flat, but may have side bolsters, seams and/or tufting that provide significant comfort to the seat occupant when seated, but interfere with the ability of the seat occupant to assume a comfortable prone position.

In addition, most such reclining seats do not provide any significant degree of privacy—usually a shell that may screen the head and shoulders, or a curtain.

Other long-haul systems provide sleeper berths that are separate from and in a different location from the seating area, in a manner similar to railway berthing arrangements. These systems require significant additional space and required the passenger to transit between a seating area and a sleeping area.

For this reason, there is a need for an individual "suite" for each passenger that includes both a seat and a bed, together with other amenities normally found in first class cabins, such as ottomans and the like.

SUMMARY OF THE INVENTION

Therefore, it is an object of the invention to provide a long-haul passenger unit having both a seat and a deployable bed.

It is another object of the invention to provide an accommodation unit that provides privacy to the passenger while either sitting in the seat or lying on the bed.

It is another object of the invention to provide an accommodation unit that has a credenza that supports the bed when in the deployed position.

It is another object of the invention to provide an accommodation unit that has an adjustable height bed and a separate seat.

It is another object of the invention to provide an accommodation unit wherein the seat supports the bed when in the deployed position.

These and other objects of the present invention are achieved in the preferred embodiments disclosed below by providing a passenger accommodation unit with deployable bed, comprising a passenger seat and a passenger bed positioned relative to the seat and adapted for movement between a stowed position wherein the bed is upright and adjacent to the seat, and a deployed position wherein the bed is horizontal for use and overlaps and is supported in part by the seat.

According to one preferred embodiment of the invention, the unit includes a credenza positioned adjacent the seat and between the seat and the bed.

According to yet another preferred embodiment of the invention, the credenza includes a height adjustment mechanism for moving the credenza between a passenger use position and a relatively lower bed support position, where the bed is supported in part by the credenza in the bed support position.

According to yet another preferred embodiment of the invention, an actuator is provided for deploying the bed onto the credenza when the credenza is moved to the bed support position.

According to yet another preferred embodiment of the invention, a foot extension panel is provided in a deployed position forward of the seat for aligning with the height of the bed in the deployed position.

According to yet another preferred embodiment of the invention, enclosure walls are positioned around at least part of the periphery of an area occupied by the seat and the bed, and include a door opening and a door movable between an open ingress/egress position and a closed, privacy position.

Preferably, the door comprises a pair of door panels mounted adjacent the door opening and mounted for unison movement.

According to yet another preferred embodiment of the invention, the door comprises a pair of door panels mounted adjacent the door opening for unison movement on a rack-and-pinion assembly whereby movement of either door causes cooperative movement of the other door.

According to yet another preferred embodiment of the invention, the passenger accommodation unit comprises a aircraft passenger accommodation unit, the seat comprises an aircraft passenger seat, and the accommodation unit is adapted for being positioned in a cabin of an aircraft.

According to yet another preferred embodiment of the invention, a long haul passenger seating set comprised of a plurality of passenger accommodation units is provided, the accommodation units being positioned in spaced-apart relation in the cabin, with at least some of the accommodation units positioned adjacent a fuselage of the aircraft and at least some of the accommodation units being positioned in an interior space in spaced-part relation to the fuselage.

According to yet another preferred embodiment of the invention, at least some of the accommodation units are positioned adjacent the fuselage are positioned in an inwardly staggered, overlapping relation to each other.

According to yet another preferred embodiment of the invention, the credenza includes a meal tray positioned for movement between a stowed storage position and a deployed use position across the seat.

According to yet another preferred embodiment of the invention, the seat includes an armrest incorporated into the credenza.

According to a preferred method of providing seating and sleeping accommodations to a passenger, the method comprises the steps of providing a passenger seat, providing a passenger bed positioned relative to the seat, moving the bed to a stowed position wherein the bed is upright and adjacent to the seat for access of the passenger to the seat, and moving the bed to a deployed position wherein the bed is horizontal for use and overlaps and is supported in part by the seat for access of the passenger to the bed for sleeping.

According to yet another preferred embodiment of the invention, the method includes the steps of providing a credenza adjacent the seat and between the seat and the bed.

According to yet another preferred embodiment of the invention, the method includes the step of providing a credenza with a height adjustment mechanism for moving the credenza between a passenger use position and a relatively lower bed support position, and further wherein the bed is supported in part by the credenza in the bed support position.

According to yet another preferred embodiment of the invention, the method includes the step of deploying the bed onto the credenza when the credenza is moved to the bed support position.

According to yet another preferred embodiment of the invention, the method includes the step of positioning a foot extension panel in a deployed position forward of the seat for aligning with the height of the bed in the deployed position.

According to yet another preferred embodiment of the invention, the method includes the step of providing an enclosure walls positioned around at least part of the periphery of an area occupied by the seat and the bed, a door opening, and a door movable between an open ingress/egress position and a closed, privacy position.

According to yet another preferred embodiment of the invention, the method includes the step of providing a door comprising a pair of door panels mounted adjacent the door opening and mounted for unison movement.

According to yet another preferred embodiment of the invention, the invention includes the step of providing a pair of door panels mounted adjacent the door opening for unison movement on a rack-and-pinion assembly whereby movement of either door causes cooperative movement of the other door.

According to yet another preferred embodiment of the invention, the method includes the step of positioning a plurality of the accommodation units is in a cabin of an aircraft.

According to yet another preferred embodiment of the invention, the method includes the steps of positioning the accommodation units in spaced-apart relation in the cabin, positioning least some of the accommodation units adjacent a fuselage of the aircraft, and positioning at least some of the accommodation units being positioned in an interior space in spaced-part relation to the fuselage.

According to yet another preferred embodiment of the invention, the method includes the steps of positioning at least some of the accommodation units adjacent the fuselage in an inwardly staggered, overlapping relation to each other.

According to yet another preferred embodiment of the invention, the invention includes the step of incorporating a seat armrest into the credenza.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
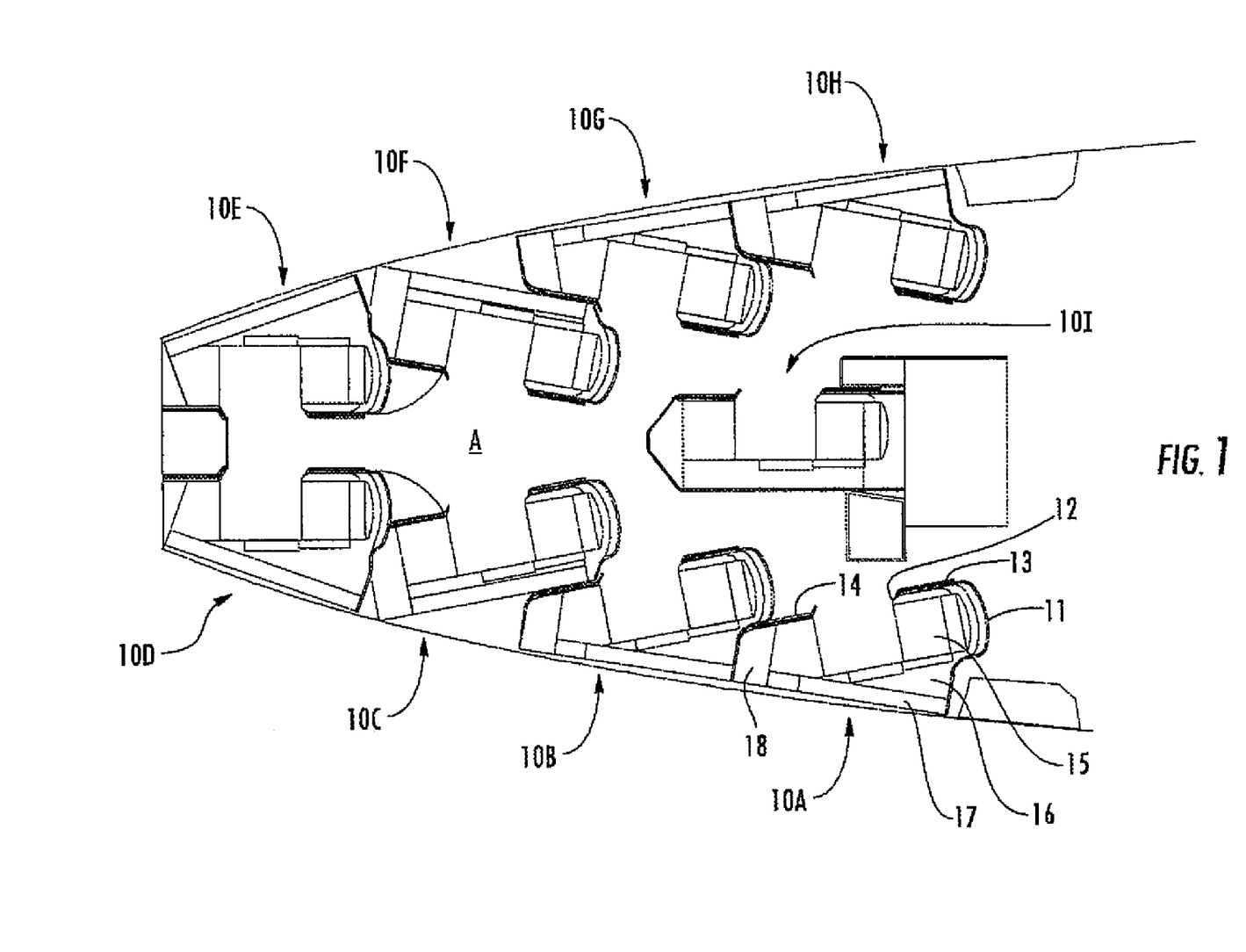
FIG. 1 is a top plan view of an aircraft first class cabin with 9 individual passenger units according to an embodiment of the invention, in the seating configuration with the bed in the stowed position.
Figure 2:
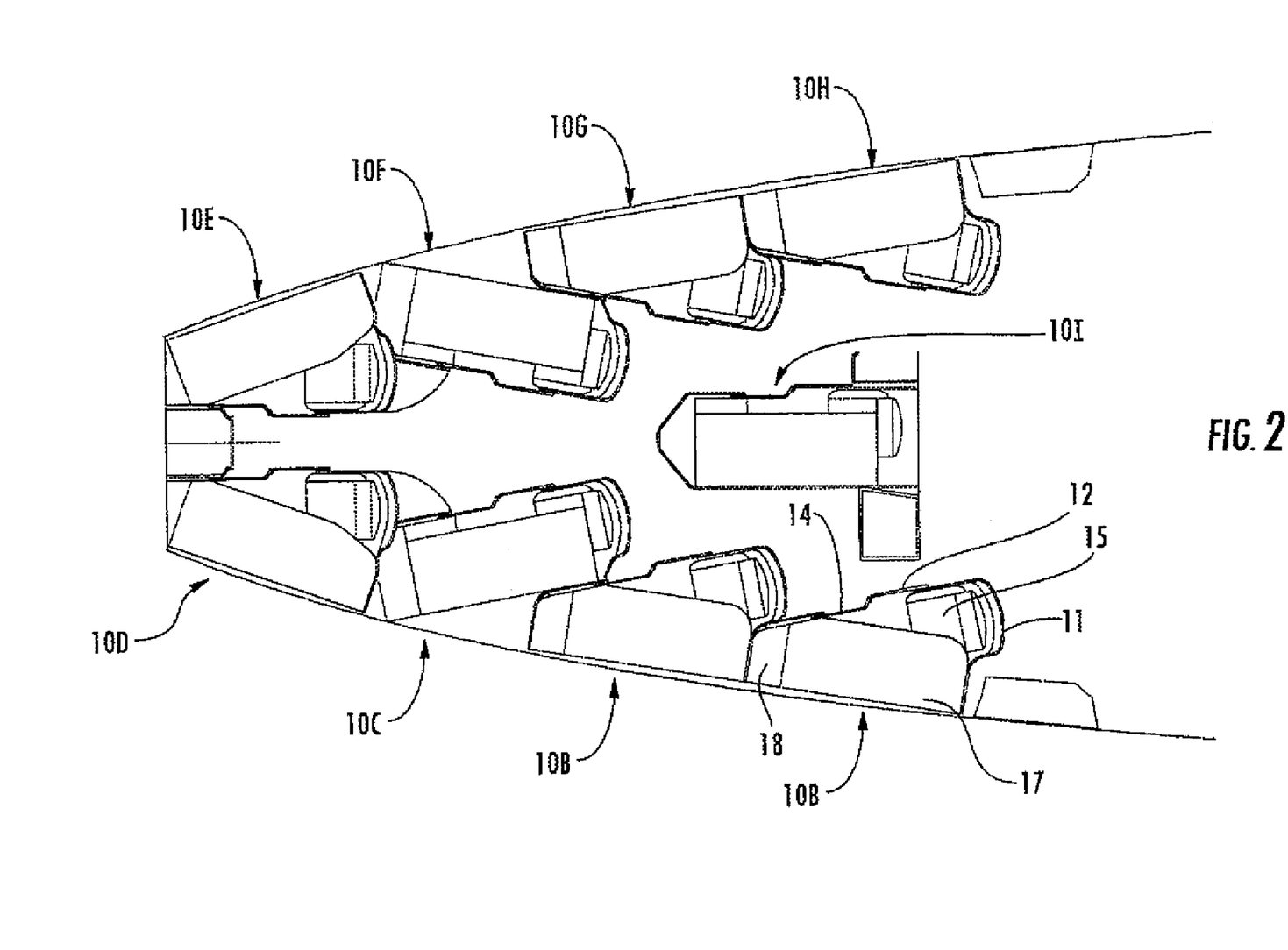
FIG. 2 is a top plan view of an aircraft first class cabin with 9 individual passenger units according to an embodiment of the invention, in the sleeping configuration with the bed in the deployed position.

Referring now specifically to the drawings, an aircraft first class cabin "A" with 9 individual passenger units 10, identified individually as accommodation units 10A-I, according to a preferred embodiment of the invention is shown in FIGS. 1 and 2. As is shown, the accommodation units 10A-I are arranged in an irregular, staggered, configuration to occupy the minimum amount of space and accommodate the forward narrowing width of the cabin "A." Six of the accommodation units 10, 10A-C and F-H, are arrayed in two rows of three each, with the forward end of the units adjacent the sides of the aircraft and the aft end angled inwardly. The two forwardmost accommodation units 10, 10D-E, are positioned generally parallel to the longitudinal axis of the aircraft fuselage, as is the ninth accommodation unit, 101, which is positioned both parallel to and centered on the longitudinal axis of the aircraft fuselage. The arrangement and number of accommodation units 10 can vary based on the area and configuration of the particular first class cabin. The accommodation units 10 are in modular form and are secured to the deck of the aircraft with track fittings, for example, those such as illustrated in applicant's U.S. Pat. Nos. 5,178,346 and 5,871,318.

Each accommodation unit 10 provides privacy by means of enclosure walls 11, and by a privacy door opening 12 that can be closed by a pair of door panels 13 and 14, as will be described in further detail below. Each accommodation unit 10 includes a passenger seat 15, a credenza 16, and a deployable bed 17, shown stowed outboard of the credenza 16 in FIG. 1 and deployed for use in FIG. 2. A foot extension panel 18 at the forward end of the accommodation unit 10 remains deployed at all times and forms the foot part of the bed 17 when deployed. A video screen may be provided above the extension panel 18.

Figure 3:
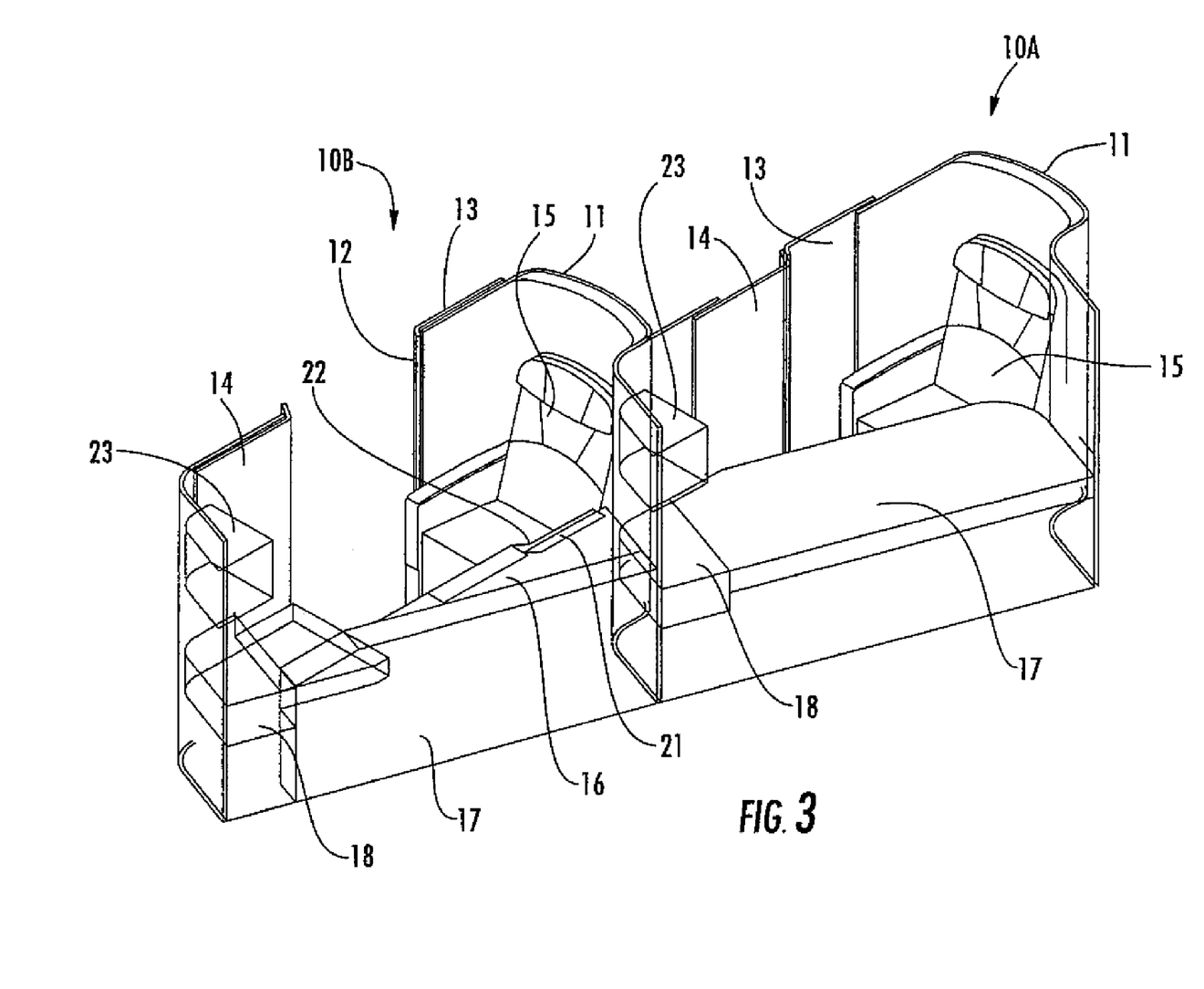
FIG. 3 is a simplified perspective view of two adjacent passenger units, with the fore unit in the seating position and the aft unit in the sleeping position.

Referring now to FIG. 3, two fore and aft-adjacent accommodation units 10A and 10B are shown for further illustrating the deployed and stowed positions, respectively.

As is shown in FIG. 3, the bed 17 is stowed in a vertically-oriented position against the side of the fuselage outboard of the credenza 16. See accommodation unit 10B. As noted and explained below, certain of the operating elements of the bed 17 are positioned under the credenza 16.

In a particular preferred embodiment, the bed 17 has a bed surface that is 80 inches (203 cm) long and 4 inches (10 cm) thick and 28 inches (71 cm) wide. The credenza 16 as a nominal height of 28 inches (71 cm), with two inches of further upward vertical adjustment up to 30 inches (76 cm). The credenza 16 also has a downward vertical adjustment of 11 inches (28 cm) down to 17 inches (43 cm). The credenza 16 also includes a bi-fold food tray 21, the height of which is adjusted with the credenza 16, and permits the seat occupant to adjust the height of the credenza 16 as needed for use as a work surface or for dining. The credenza 16 also contains the key pad for the seat controls, and handset storage.

Preferably, when the credenza 16 is lowered to its lowermost position, for example, 17 inches (43 cm), the bed 17 automatically deploys. The outermost armrest 22 is integrated into the credenza 16 so that the deployed bed 17 overlaps the bottom cushion of the seat 15. The bed 17 and seat 15 may be angled relative to each other at, for example, the angle as shown, or may be parallel to each other.

The rotating part of the bed 17 does not comprise the full 80 inch (203 cm) length, the foot extension panel 18, which remains deployed at all times, supplying approximately 11 inches (28 cm) of the total length. The foot extension panel 18 tapers to a width of 24 inches (61 cm). Of course, these dimensions are variable to account for differences in materials, space available for placement of the accommodation units 10, permissible maximum weight, and similar factors known to those in the art.

A video screen 23 and related electronics are positioned above the foot extension panel 18.

The doors 13 and 14 are mounted on slides and operate by means of a rack-and-pinion mechanism, not shown, in the floor. A single deployment handle on the door 13 permits ease of use from the seated position, and serves to operate both the door 14 and the door 14 by means of the rack-and-pinion mechanism. A magnetic latch near the handle maintains the doors 13 and 14 in the open or closed position, as desired, but can be opened easily from either the inside or the outside when necessary.

The seat 15 may be any type of aircraft passenger seat otherwise suitable to the intended use as a first class cabin seat. Preferably, the upper end of the seat back is tapered so that it is relatively thin, thus permitting the seat back to recline further towards the wall 11 aft of the seat 15. The seat 15 may have a width between armrests of about 22 inches, and preferably should be provided with an additional 3.5 inches (9 cm) of translation in order for the seat 15 to recline to the bed mode.

Preferably, an ottoman, not shown, will provide a rest for the feet of the seat occupant, with stowage space beneath the ottoman.

Figure 4:
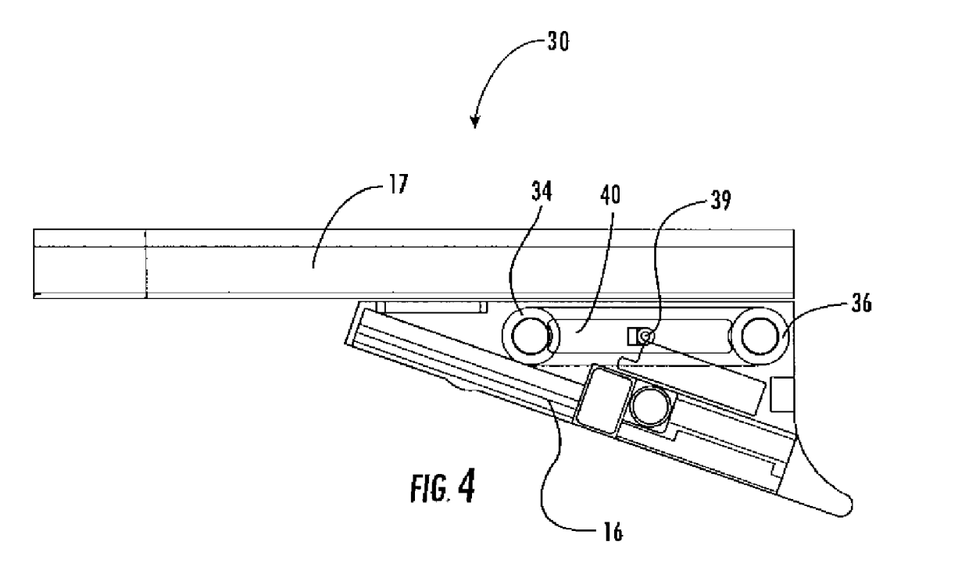
FIG. 4 is a top view of the bed in the stowed position.
Figure 5:
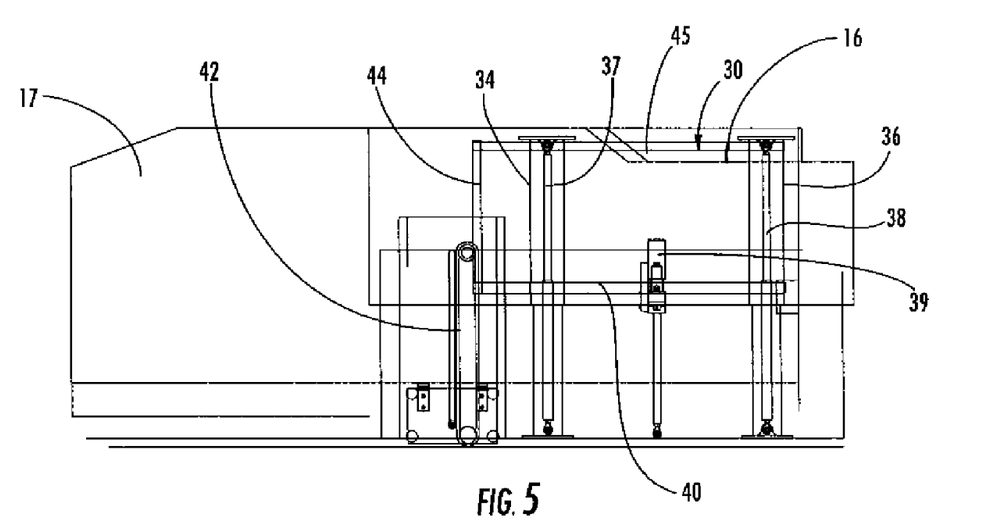
FIG. 5 is a side view of the bed in the stowed position.

Referring now to FIGS. 4-8, the deployment mechanism 30 for deploying the bed 17 and adjusting the height of the credenza 16 is illustrated and explained. Tubular guides 34, 36 enclose a pair of gas struts 37, 38. A centrally-mounted actuator 39 drives the gas struts 37, 38 through a vertical drive unit 42 and a main rack drive 44. The actuator is mounted on and drives a pair of drive rack cross-members 45, 46. The position of the above-described elements when the bed is in the stowed, vertical position is shown in FIGS. 4 and 5.

Figure 6:
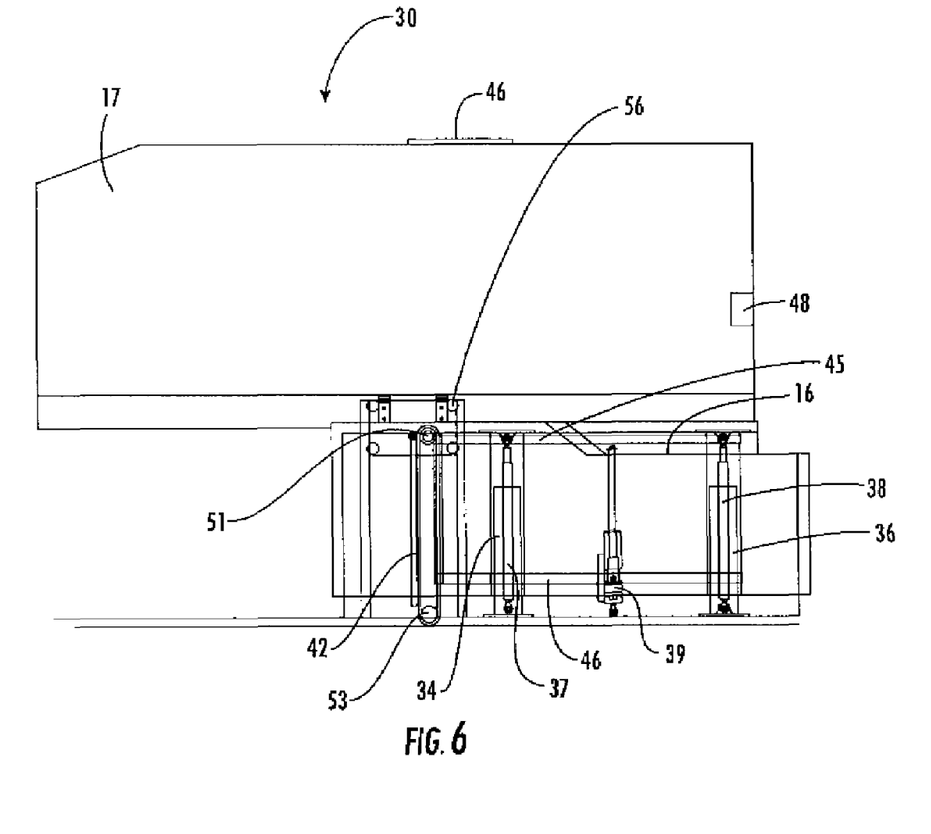
FIG. 6 is a side view of the bed in the deployed position before rotation into the horizontal position.
Figure 7:
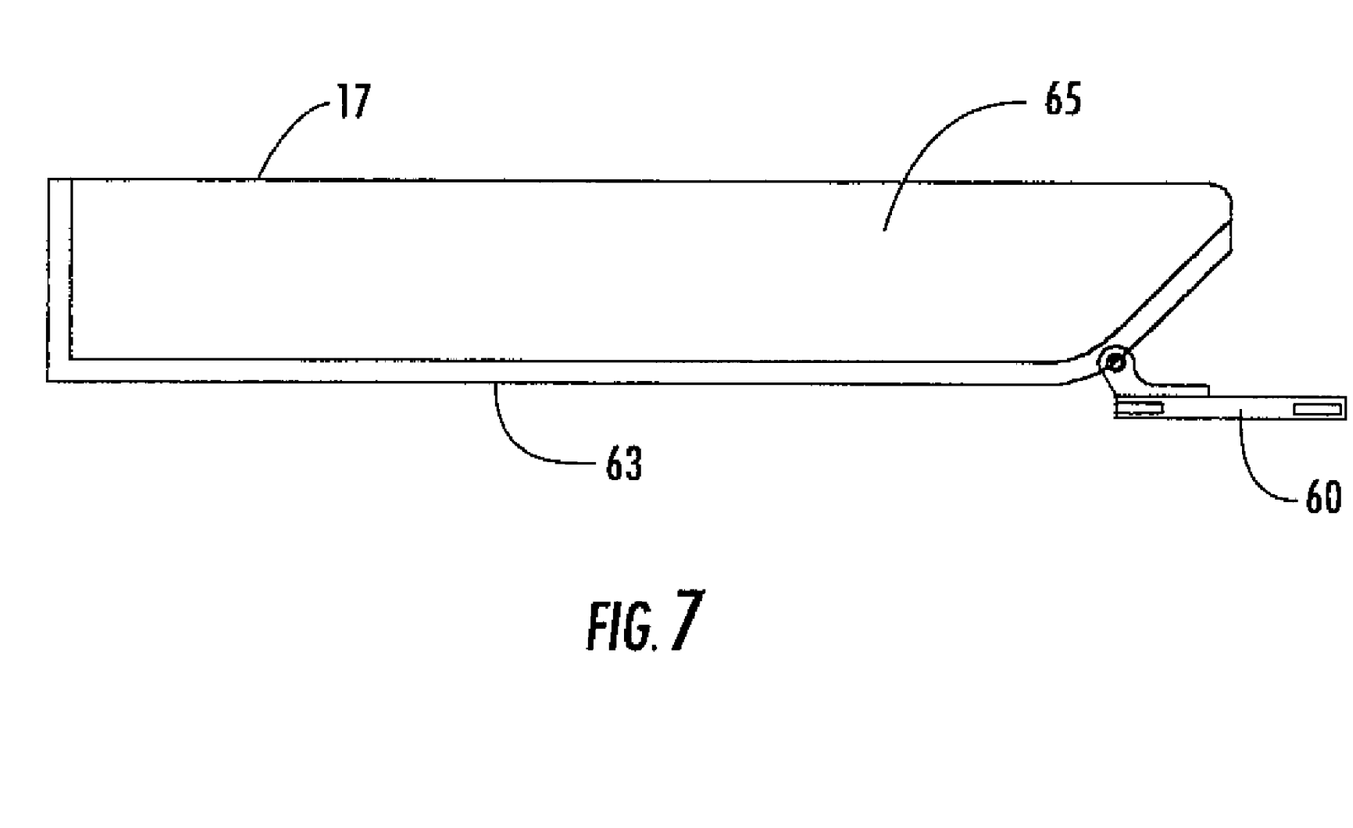
FIG. 7 is a end view of the bed in the deployed position before rotation into the horizontal position.
Figure 8:
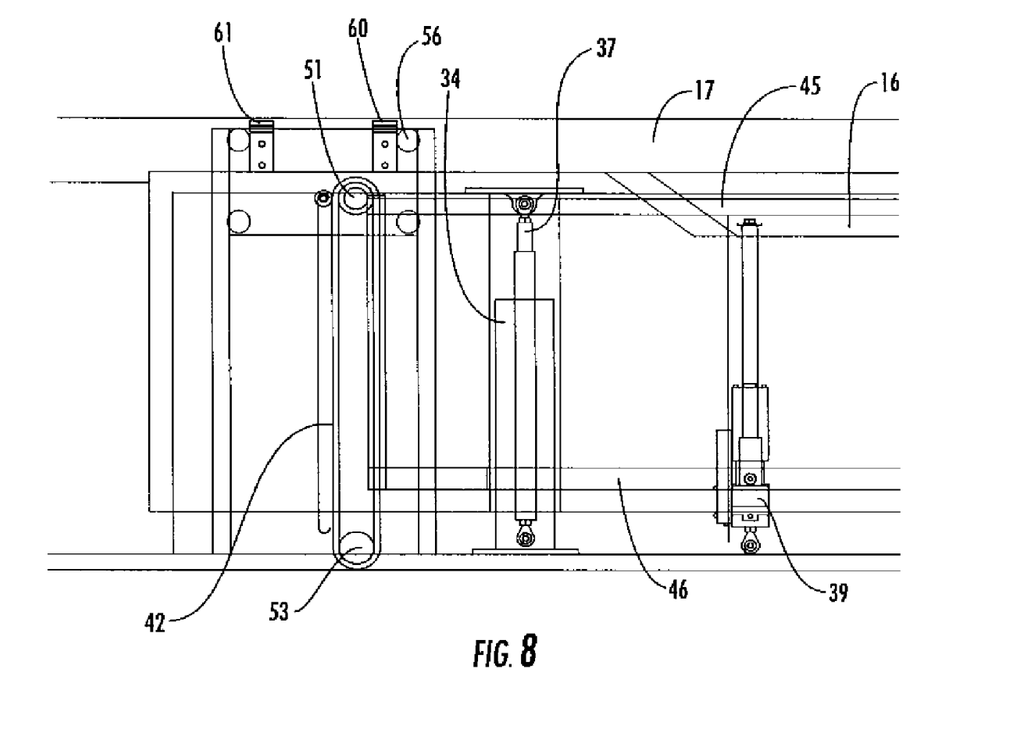
FIG. 8 is a side view of the bed, showing the details of the bed deployment and credenza height adjustment mechanism.

The deployed bed 17 while still in its vertical, raised, position is shown in FIGS. 6 and 7. The bed 17 includes a release handle 46 and a latch 48. As shown, the bed 17 has traveled vertically upwardly 15.5 inches (39 cm) as the gas struts 37 and 38 have compressed. The actuator 39 compresses the gas struts 37 and 38 in order to reduce deployment forces and to balance system loads. The drive gears 51, 53 of the drive unit 42 have a ratio to move the bed 17 the required 15.5 inches (39 cm) with only 10 inches (25.4 cm) of movement of the drive unit 42.

A rack and pinion bed pivot mechanism 56 is provided for ease of operation and stability.

When the bed 17 has reached its required vertical height, it is pivoted 90 degrees on hinges 60, 61 into a horizontal position with the bed 17 is horizontal alignment with the foot extension panel 18, and overlapping the credenza 16 and the bottom cushion of the seat 15, thus providing a very stable, strong support without the need for a cantilever system to support the bed 17 from only one side. As is best shown in FIG. 7, bed 17 includes a shell 63, which may be a lightweight sheet material such as aluminum, carbon fiber, fiberglass, or the like, in which is carried a lightweight, firm mattress 65. Of course, all of the elements of the seat unit 10 comply with standards and requirements for weight, flame and smoke retardancy.

An aircraft accommodation unit with a deployable bed is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A passenger accommodation unit, comprising:
   (a) a passenger seat comprising a seat back and a seat bottom; and
   (b) a passenger bed positioned relative to the seat and adapted for movement between:
      (i) a stowed position to rest on a deck wherein the bed is substantially upright and adjacent to the seat, and
      (ii) a deployed position wherein the bed is substantially horizontal for use and is directly supported by at least a part of the seat bottom
   (c) wherein the passenger bed is substantially rectangular and includes a longitudinal axis and a lateral axis, and further wherein the bed sits on the longitudinal axis when in the stowed position and movement of the passenger bed between the stowed and deployed positions includes pivoting the passenger bed about the longitudinal axis, and movement of the passenger bed from the stowed position to the deployed position includes elevating the passenger bed.

2. A passenger accommodation unit according to claim 1, further comprising a credenza positioned between the seat bottom and the bed when in the stowed position.

3. A passenger accommodation unit according to claim 2, wherein the passenger seat further comprises at least one armrest integrated into the credenza.

4. A passenger accommodation unit according to claim 2, further comprising a height adjustment mechanism for moving the credenza between a passenger use position and a relatively lower bed support position, wherein the bed is supported at least in part by the credenza in the bed support position.

5. A passenger accommodation unit according to claim 4, and including an actuator for deploying the bed onto the credenza when the credenza is moved to the bed support position.

6. A passenger accommodation unit according to claim 1, and including a foot extension panel in a deployed position forward of the seat for aligning with the height of the bed in the deployed position.

7. A passenger accommodation unit according to claim 5, and including enclosure walls positioned around at least part of the periphery of an area occupied by the seat and the bed, and including a door opening and a door movable between an open ingress/egress position and a closed, privacy position.

8. A passenger accommodation unit according to claim 6, wherein the door comprises a pair of door panels mounted adjacent the door opening for unison movement on a rack-and-pinion assembly whereby movement of either door causes cooperative movement of the other door.

9. A passenger accommodation unit according to claim 8, wherein the passenger seat includes a seat back and a seat bottom, and further wherein the bed is supported by the armrest and the seat bottom when in the deployed position.

10. A passenger accommodation unit according to claim 1, further comprising an actuator for elevating the passenger bed.

11. A passenger accommodation unit according to claim 1, wherein the passenger seat is positioned on a floor, and the passenger bed rests on the floor along its longitudinal axis when in the stowed position.

12. A passenger accommodation unit, comprising:
    (a) a passenger seat including at least one armrest; and
    (b) a passenger bed positioned proximate the seat and adapted for movement between:
        (i) a stowed position to rest on a deck wherein the bed is upright and adjacent to the seat, and
        (ii) a deployed position wherein the bed is horizontal for use and supported at least in part by the armrest; and
    (c) wherein the passenger bed is substantially rectangular and includes a longitudinal axis and a lateral axis, and further wherein the bed sits on the longitudinal axis when in the stowed position and movement of the passenger bed between the stowed and deployed positions includes pivoting the passenger bed about the longitudinal axis, and movement of the passenger bed from the stowed position to the deployed position includes elevating the passenger bed.

13. A passenger accommodation unit according to claim 12, and further comprising:
    (a) a height adjustment mechanism for moving the armrest between a passenger use position and a relatively lower bed support position wherein the bed is supported at least in part by the armrest; and
    (b) an actuator for deploying the bed onto the armrest when the armrest is moved to the bed support position.

14. A passenger accommodation unit comprising:
    (a) a passenger seat; and
    (b) a passenger bed including a major surface for supporting a passenger thereon, the bed positioned proximate the seat and adapted for movement between:
        (i) a stowed position to rest on a deck wherein the major surface of the bed is substantially vertical and extends no higher than the passenger seat, and
        (ii) a deployed position wherein the major surface of the bed is substantially horizontal for use and is supported at least in part by the seat
    (c) wherein the passenger bed is substantially rectangular and includes a longitudinal axis and a lateral axis, and further wherein the bed sits on the longitudinal axis when in the stowed position and movement of the passenger bed between the stowed and deployed positions includes pivoting the passenger bed about the longitudinal axis, and movement of the passenger bed from the stowed position to the deployed position includes elevating the passenger bed.

15. A passenger accommodation unit according to claim 14, wherein:
    (a) the passenger seat comprises a seat back and a seat bottom; and
    (b) the major surface of the passenger bed is substantially perpendicular to the seat bottom when in the stowed position and substantially parallel to the seat bottom when in the deployed position.

16. A passenger accommodation unit according to claim 15, wherein the passenger bed is directly supported by at least a part of the seat bottom when in the deployed position.

17. A passenger accommodation unit according to claim 14, further comprising a credenza positioned between the seat and the bed when in the stowed position.

18. A passenger accommodation unit according to claim 14, further comprising a rack and pinion bed pivot mechanism for pivoting the passenger bed about the longitudinal axis.

* * * * *